United States Patent

McKinsey et al.

[15] 3,692,376

[45] Sept. 19, 1972

[54] CASE FOR RECORDING TAPE CASSETTES

[72] Inventors: Kevin P. McKinsey, Northfield; Thomas C. Mills, Wheaton, both of Ill.

[73] Assignee: Double Sixteen Company

[22] Filed: Dec. 17, 1970

[21] Appl. No.: 99,007

[52] U.S. Cl. .......... 312/11

[51] Int. Cl. .......... A47b 81/06

[58] Field of Search .......... 312/10, 11, 97.1, 285, 283; 220/97 F

[56] References Cited

UNITED STATES PATENTS

| | | | |
|---|---|---|---|
| 3,334,950 | 8/1967 | Brownlee | 312/10 |
| 1,030,534 | 6/1912 | Pooler | 312/10 |
| 1,191,003 | 7/1916 | Hughes | 312/11 |
| 1,444,268 | 2/1923 | Pfeffer | 312/283 X |
| 3,243,068 | 3/1966 | Huston | 220/97 F X |
| 2,567,322 | 9/1951 | Curtis | 220/97 F X |
| 1,311,322 | 7/1919 | Culverwell | 312/10 |

FOREIGN PATENTS OR APPLICATIONS

| | | | |
|---|---|---|---|
| 25,251 | 1910 | Great Britain | 312/10 |

*Primary Examiner*—James C. Mitchell
*Attorney*—Molinare, Allegretti, Newitt & Witcoff

[57] ABSTRACT

A carousel case for recording tape cassettes employs a spool-shaped cassette housing having a cylinder, a lower shelf connected to one end of the cylinder and a top piece connected to the other end of the cylinder. The cassette housing is rotatably mounted on a cone-shaped base. Radial slats are provided on the shelf and radial guides on the top piece to secure the cassettes within the housing.

4 Claims, 8 Drawing Figures

INVENTORS
KEVIN P. McKINSEY &
THOMAS C. MILLS
BY Molinare, Allegretti, Newitt & Witcoff
ATTORNEYS INVENTORS
KEVIN P. McKINSEY &
THOMAS C. MILLS
BY Molinare, Allegretti, Newitt & Witcoff
ATTORNEYS INVENTOR
KEVIN P. McKINSEY &
THOMAS C. MILLS
BY Molinare, Allegretti
Newitt & Witcoff
ATTORNEYS

CASE FOR RECORDING TAPE CASSETTES

BACKGROUND OF THE INVENTION

The present invention is related generally to a carousel case for housing recording tape cassettes. The tape cassette is a recently developed and overwhelmingly popular package for sound reproduction on magnetic tapes. The tape cassette includes a plastic covering for a wound magnetic tape.

Although the cassette provides a convenient enclosure for an otherwise vulnerable tape, the cassette covering itself is subject to possible damage through abuse and mistreatment. Also, the cassettes may be easily misplaced. It is, therefore, desirable to provide a protective and convenient storage case capable of housing a number of the cassettes. It is additionally desirable to provide such a storage case which is easily portable and which may be nested together with other such cases in a stack. It is further desirable to provide such a case of simple and economic construction.

SUMMARY OF THE INVENTION

In a principle aspect the present invention is generally related to a case for recording tape cassettes. The case includes a mounting means, a means for housing the recording tape cassettes, and a means for rotatably connecting the housing means to the mounting means. In a preferred embodiment the housing means is spool-shaped having a cylinder and projecting outwardly from the axis of the cylinder and an annular top piece connected to the other end of the cylinder and projecting outwardly from the axis of the cylinder.

BRIEF DESCRIPTION OF THE DRAWINGS

There follows a brief description of the drawings showing a presently preferred embodiment of the present invention in which like numerals refer to like elements and in which.

DETAILED DESCRIPTION OF THE PREFERRED EMBODIMENT OF THE INVENTION

Figure 1:
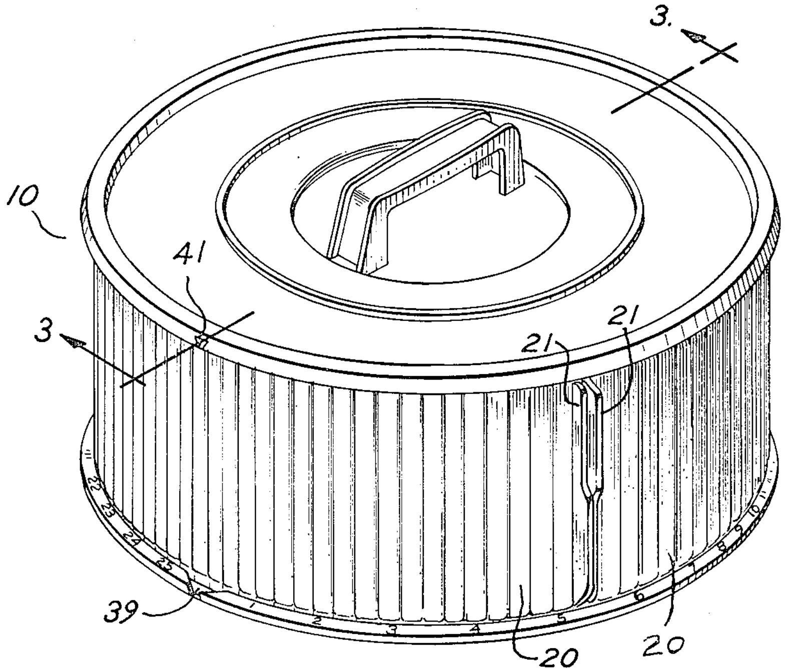
FIG. 1 is a perspective view of the case for recording tape cassettes of this invention with the sliding door in the closed position.
Figure 2:
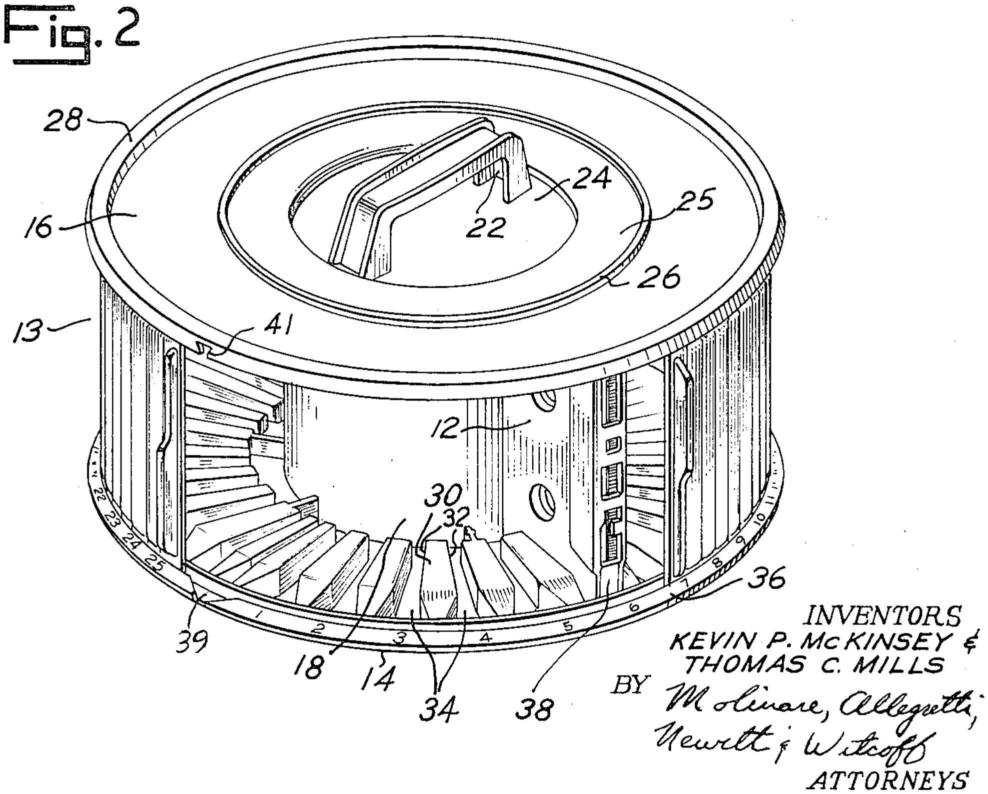
FIG. 2 is a second perspective view of the cassette case of this invention with the sliding door in the open position.

Referring generally to FIGS. 1 and 2, a carousel case 10 for housing tape recording cassettes 12 is shown. The case 10 includes a spool-shaped cassette housing means 13. The cassette housing means 13 includes a lower annular shelf 14 and an upper annular top piece 16. An upwardly extending cylinder core 18 is connected at opposite ends to the inner perimeters of the top piece 16 and shelf 14. The shelf 14 and top piece 16 are mutually coextensive and extend outwardly from the longitudinal axis of the cylinder 18.

A pair of upright tambour doors 20 are slidably connected to the outer perimeters of the top piece 16 and shelf 14. The doors 20 are ribbed to increase their flexibility and esthetic appearance. The added flexibility allows the doors 20 to easily conform to the circular cross sectional shape of the housing 13. The doors 20 may be opened to provide easy access to the cassettes 12 and closed to protect the cassettes 12. The tambour doors 20 are cylindrically shaped around the housing 13 and fit one within the other when the doors are opened.

Flanged handle members 21 integral with the ends of the doors 20 are provided to open and close the doors 20. A U-shaped case handle 22 is connected to the circular center portion 24 of the top piece 16. An annular band 25 having an inner ridge 26 concentric with the center portion 24 is defined on the top piece 16. An outer annular ridge 28 concentric with the inner ridge 26 is defined on the outer perimeter of the top piece 16.

The annular shelf 14 includes a plurality of upright lower radial slats 30 connected thereto. Each of the slats 30 has a pair of elongated lateral side runs 32. The corresponding side runs 32 of adjacent slats 30 are substantially parallel to form cassette channels 34 each having a width slightly greater than the width of the cassette 12. Thus the cassettes 12 may be snugly secured between the side runs 32.

The shelf 14 also includes an outer annular lip 36 defined along the perimeter thereof. A cassette identification code in the form of numbers ranging from one through twenty-five is embossed around the lip 36. Each number corresponds to a unique cassette channel 34 so that the cassettes 12 stored in the case 10 may be easily identified. In practical use an index card (now shown) and labels (not shown) which may be affixed to the back edges 38 of the cassettes 12 are provided together with the case 10 to facilitate the use of the number code.

A V-shaped lower notch 39 is defined in the outer lip 36. A corresponding upper notch 41 is defined in the upper ridge 28 directly above the notch 39. These notches 39 and 41 are provided as a removal mechanism for the doors 20. When a user wishes to remove the doors 20 from the case 10, he need only withdraw the doors 20 through the notches 39 and 41.

Figure 3:
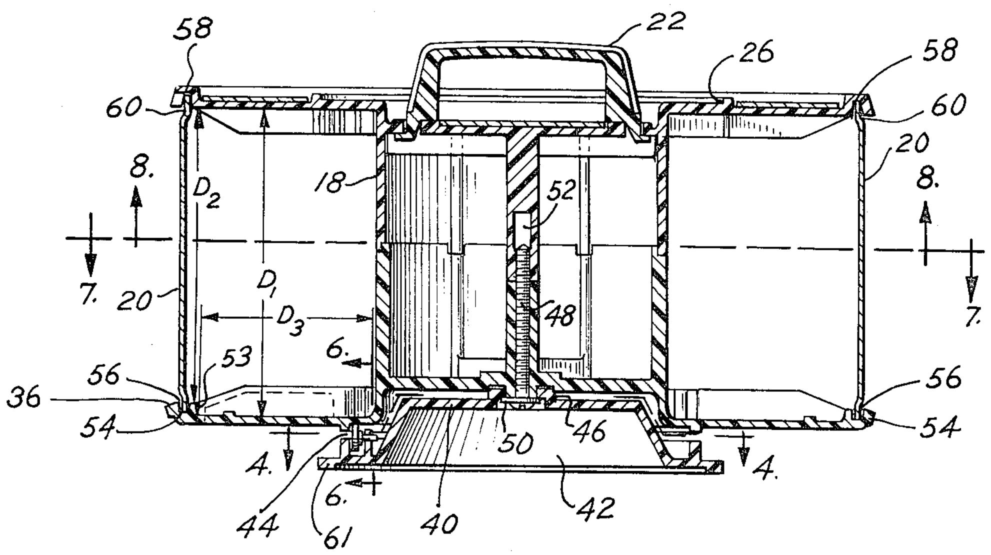
FIG. 3 is a side cross-sectional view of the case of this invention taken substantially along the lines 3—3 of FIG. 1.

Referring now to FIG. 3, the case 10 includes a mounting means or base 40 hereinafter referred to as base 40 taking the shape of a truncated cone defining a cavity 42 therein. The case 40 includes a flat annular rim 61 connected thereto and extending outwardly therefrom. The rim 61 increases the stability of the base 40. A means for rotatably connecting the spool-shaped cassette housing 13 to the mounting means or base 40 includes roller assemblies 44, only one of which is shown in FIG. 3, and may include a bearing assembly 46. The cylinder 18 of the housing 13 is firmly attached to the base 40 by a threaded screw 48 which projects upwardly from a ring washer 50 into a cylindrical shaft 52 defined axially in the center of the spool cylinder core 18. The bearing assembly 46 may be eliminated if the roller assemblies 44 are adapted to suspend the cassette housing 13 above the base 40 to avoid frictional contact therebetween. The rotatable connecting means allows the cassette housing 13 to spin freely bringing any desired cassette 12 to a user's fingertips.

The slidable tambour doors 20 are provided as an added feature of this invention and may be eliminated for the sake of greater economy in construction. The doors 20 are secured to the cassette housing 13 as follows. An annular abutment ridge 53 is defined on the shelf 14 concentric with the lip 36. The abutment member 53 is in close proximity with the lip 36 and extends upwardly from the shelf 14 coextensive with the lip 36. The abutment ridge 53 and lip 36 define an annular channel 54 therebetween which is adapted to receive the bottom edge 56 of the tambour doors 20. Similarly, an upper annular channel 58 is defined in the ridge 28 to extend downwardly therefrom and is adapted to receive the upper edge 60 of the tambour doors 20. In this manner the doors 20 are slidably secured along the outer perimeter of the spool-shaped cassette housing 13.

The shelf 14 is spaced apart from the top piece 16 by the core 18 a first predetermined distance D1, somewhat greater than the height of the standard cassette 12. The abutment ridge 53 extends upwardly from the shelf 14 and is spaced apart from the top piece 16 a second predetermined distance D2, somewhat less than the distance D1, but slightly greater than the height of the standardized cassette 12. Also, the shelf 14, core 18 and ridge 53 are dimensioned so that the radial distance D3 from the ridge 53 to the core 18 in each of the cassette channels 34 is slightly greater than the depth of the standardized cassette 12 when inserted in the case 10.

In this manner when the cassettes 12 are inserted into the case 10, the lower edge thereof drops down onto the shelf 14 below the ridge 53. Thus the cassettes 12 are held into the housing 13 by gravity and must be lifted up over the ridge 53 and lip 36 to be withdrawn from the housing 13. Therefore, the cassettes 12 are prevented from tumbling out of the housing 13 when the case 10 is accidentally tipped.

The case 10 is constructed so that it may be vertically stacked together with the other cases 10 one on top of another in an esthetically pleasing manner and in order to conserve space. In particular, the base 40 is dimensioned to fit on the top piece 16 with the outer annular rim 61 of the base 40 snugly abutting the ridge 26 of top piece 16. For this purpose, the diameter of the rim 61 is dimensioned slightly less than the diameter of the ridge 26. When one of the cases 10 is stacked on top of another of the cases 10, the rim 61 of the upper case 10 rests within the ridge 26 of the lower case 10. The stability of the stacked cases 10 is thus increased since they are thereby interlocked. Also the cavity 42 defined in the base 40 is adapted to receive and nest the handle 22 therein. Thus, the cases 10 may be easily and conveniently stacked. Because the base 40 suspends the housing 13 thereabove, the housings 13 of each of the carousel cases 10 stacked together may be freely and independently rotated.

Figure 4:
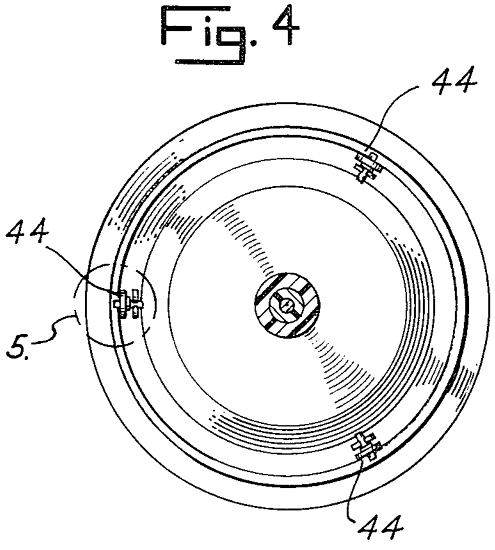
FIG. 4 is a top cross-sectional view of the base for the cassette housing of this invention taken substantially along the lines 4—4 of FIG. 3.

As may be seen more clearly in FIG. 4, three roller assemblies 44 are connected to the base 40. These assemblies 44 are connected at angles of 120° with respect to one another about the outer rim 61 of the base 40. Additional roller assemblies 44 may be included, although a device employing a minimum number of these roller assemblies 44 improves the economical construction of the case 10.

Figure 5:
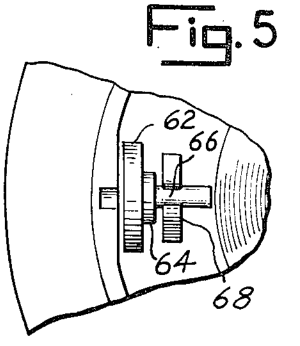
FIG. 5 is an enlarged top view of the roller area 5 shown in FIG. 4.
Figure 6:
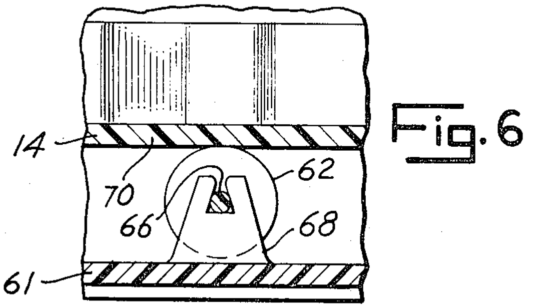
FIG. 6 is a side view of the roller and mounting shown in FIG. 5.

Referring now to FIGS. 5 and 6 each roller assembly 44 includes a circular roller 62 and a bearing member 64 connected to one side thereof. The roller 62 and bearing member 64 are mounted for rotation on an axial rod 66 which is rotatably connected to a fulcrum member 68. The fulcrum member 68 is rigidly connected to the outer rim 61 of the base 40. The roller 62 is mounted above the base and adapted to ride against the underside 70 of the shelf 14. The roller 62 and fulcrum member 68 are dimensioned to suspend the spool-shaped cassette housing 13 above the base 40 so as to avoid frictional contact therebetween.

Figure 7:
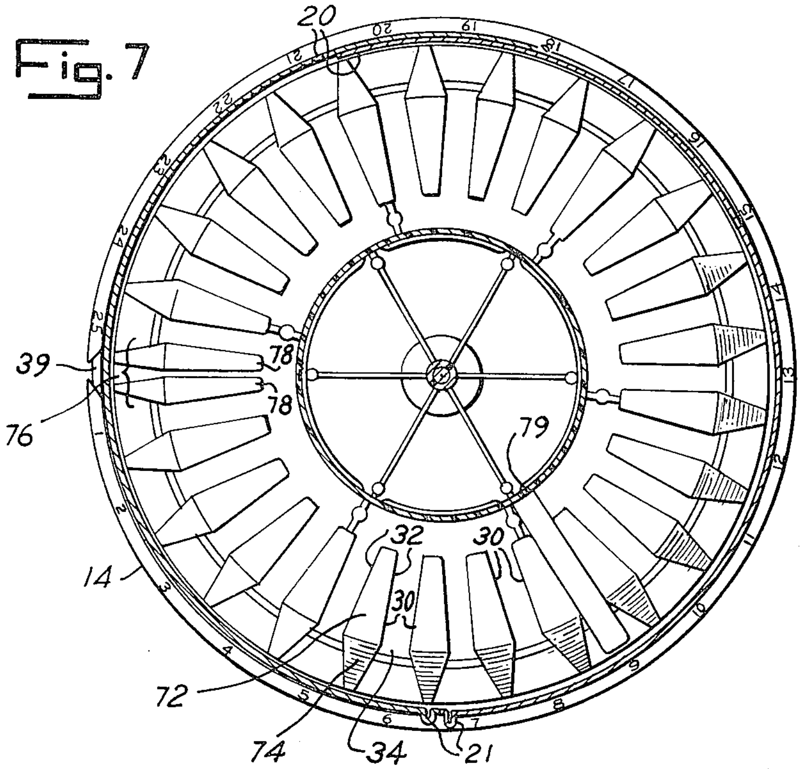
FIG. 7 is a top cross-sectional view of the lower shelf of this invention taken substantially along the lines 7—7 of FIG. 3.

As may be seen more clearly in FIG. 7 there are 24 substantially identical slats 30 each having side runs 32 defined therealong to form cassette channels 34, as has been described. Each of the slats 30 also include a flat top run 72 and an inclined, tapered front run 74. The inclined tapered front runs 74 provide wide openings for the cassette channels 34 enabling the cassettes to be easily inserted in the channels 34 and alleviating the need for careful alignment of the cassettes 12 with the channels 34 prior to insertion.

The twenty-fifth slat member 76 adjacent the notch 39 includes a pair of slats 78 each similar in shape to the slats 30 and somewhat smaller than the slats 30. The slat member 76 is dimensioned to allow the other slats 30 to be symmetrically distributed on the shelf 14. The cassette 12 should be inserted into the case 10 with the tape contact edge 79 of the cassette leading. When the cassette 12 is so inserted, the tape contact edge 79 of the cassette 12 abuts the outer surface of the cylinder core 18. In this way the magnetic tape within the cassette 12 which is exposed along the contact edge 79 is isolated from dust and the like and protected from damage.

Figure 8:
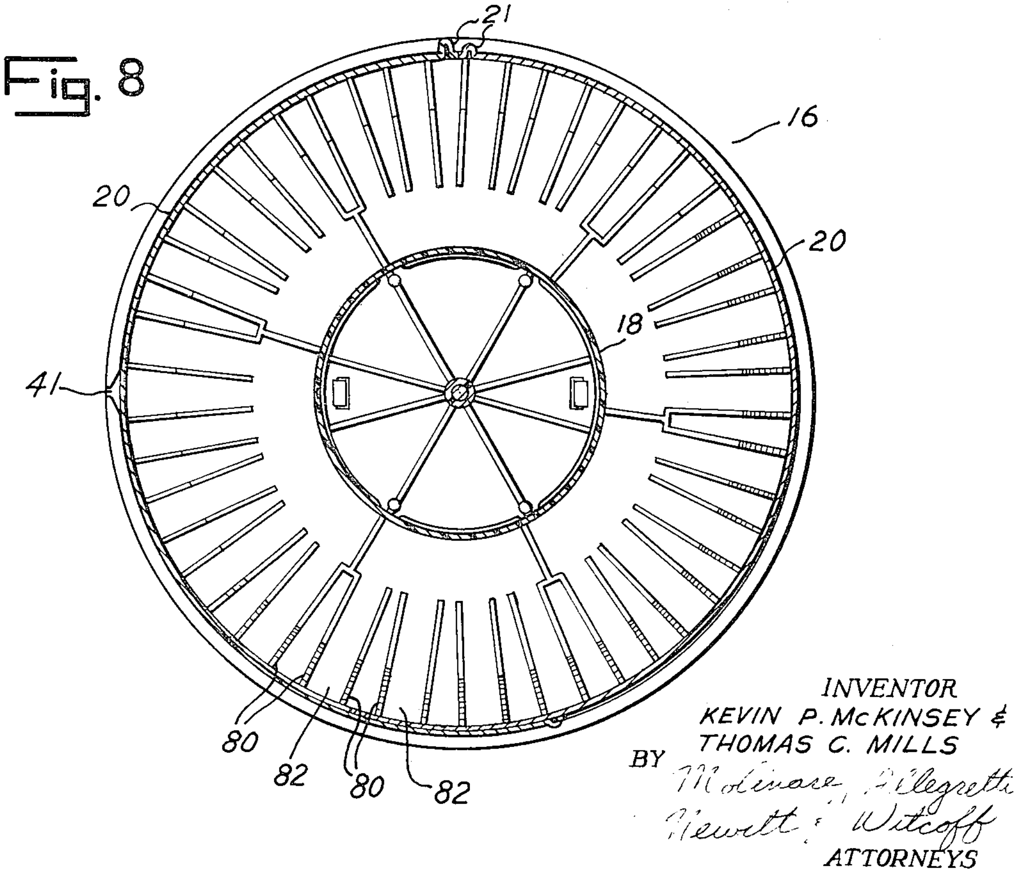
FIG. 8 is a bottom cross-sectional view of the top piece of this invention taken substantially along the lines 8—8 of FIG. 3.

Referring to FIG. 8 the top piece 16 includes 24 radially extending cassette guides 80. The corresponding sides of each adjacent pair of guides 80 are parallel to form radially extending cassette channels 82. The guides 80 are aligned to form channels 82 corresponding to and directly above the channels 34 in the shelf 14. Thus when the cassettes 12 are inserted in the housing 13, they are held vertically between lower channels 34 of the shelf 14 and the upper channels 82 of the top piece 16.

It is to be understood that the embodiment of the invention which has been described is merely illustrative of one application of the principles of the invention. Numerous modifications may be made to the disclosed embodiment without departing from the true spirit and scope of the invention.

What is claimed is:

1. A carousel case for recording tape containers comprising, in combination;

a mounting means; and a container housing means rotatably connected to said mounting means, said housing means including an upright core, a lower shelf connected to one end of said core to extend outwardly therefrom, a top piece connected to the other end of said core to extend outwardly therefrom, said top piece and said shelf adapted to radially receive a plurality of the containers therebetween, said top piece being spaced apart from said shelf a first predetermined distance greater than the height of said, containers a ridge connected to the outer portion of said shelf to extend upwardly therefrom and spaced apart from said top piece a second predetermined distance less than said first predetermined distance and greater than the height of said containers such that said containers are held securely within said container housing means, an outer lip defined about the outer portion of said shelf outwardly of and adjacent to said ridge, said lip and said ridge forming a first annular channel therebetween, a pair of flexible doors for said carousel case, an outer annular ridge defined on said top piece having a second channel defined therein and extending downwardly therefrom, said channels adapted to receive said flexible doors slidably therein.

2. The apparatus as set forth in claim 1 including a first notch defined in said outer lip and a corresponding second notch defined in said outer annular ridge connected to said top piece directly above said first notch whereby said flexible doors may be removed from said carousel case by withdrawing the doors through said first and second notches.

3. A carousel case for recording tape containers comprising, in combination:

a mounting means;

a container housing means rotatably connected to said mounting means and comprising a spool member having a cylinder, a lower annular shelf adapted to receive a plurality of the cassettes connected to one end of the cylinder and an upper top piece connected to the other end of said cylinder to project outwardly from the axis thereof; a handle connected to the center portion of said top piece, said mounting means including a cavity defined therein and adapted to conform to the shape of said handle, such that the handle of one of said cases may be nested into the cavity of another of said cases, said mounting means adapted to suspend said container housing means thereabove, whereby the cassette housing means of said cases may be freely and independently rotated when said cases are stacked together.

4. A carousel case for recording tape containers comprising, in combination:

a mounting means;

a means for housing a plurality of recording tape containers therein including an annular shelf having a plurality of lower radial slats defined thereon and spaced about said shelf to define a plurality of container channels for securely receiving a plurality of said containers therein, each of said slats including a flat top run and an inclined, tapered front run whereby adjacent ones of said inclined tapered front runs provide wide openings for said container channels enabling the containers to be easily inserted in said channels, said slats also including two elongated side runs wherein the corresponding side runs of each pair of adjacent slats are substantially parallel to snugly secure said containers therein.

* * * * *